Jan. 21, 1936.  F. M. CLARK ET AL  2,028,590
ELECTRIC CAPACITOR AND METHOD OF FABRICATION
Filed Nov. 30, 1934

Inventors:
Frank M. Clark,
Ralph A. Ruscetta,
by Harry E. Dunham
Their Attorney

Patented Jan. 21, 1936

2,028,590

UNITED STATES PATENT OFFICE 2,028,590

ELECTRIC CAPACITOR AND METHOD OF FABRICATION

Frank M. Clark and Ralph A. Ruscetta, Pittsfield, Mass., assignors to General Electric Company, a corporation of New York Application November 30, 1934, Serial No. 755,427

4 Claims. (Cl. 175—315)

The present invention comprises new and improved electric capacitors and the method of their fabrication.

Electrolytic capacitors containing film-forming armatures, or electrodes, operating in contact with a dilute water solution of an ionizable compound such as a salt or an acid, have been characterized by a relatively high power factor in operation. It has been suggested to construct capacitors by assembling the armatures in close juxtaposition but separated by a porous spacer to introduce a suitable salt solution into the spacer and then to wholly remove the water by evaporation, leaving the salt in dry crystalline condition in the pores of the spacer. Capacitors so made are suitable only for very low voltages.

In accordance with our present invention we have provided improved capacitors of higher efficiency and operable at higher voltages in which the capacitor armatures, or plates, are separated from one another by fine particles of solid material of good dielectric properties, such as a suitable salt, the voids or spaces remaining being impregnated with a saturated aqueous solution.

In accordance with a process feature of our invention, capacitor assemblies containing a porous spacer are treated in accordance with our invention by first filling the voids in said spacer with a hot solution containing a relatively large quantity of a suitable salt in solution, and then, when the impregnation of the porous spacer has proceeded far enough, rapidly cooling the impregnated assembly, as, for example, by introducing it into a colder saturated solution of the same salt. As a result of the fall in temperature, less of the salt can remain in solution, hence the interstices of the spacer become charged with fine salt crystals, the remaining spaces being filled with a saturated aqueous solution.

Figure 2:
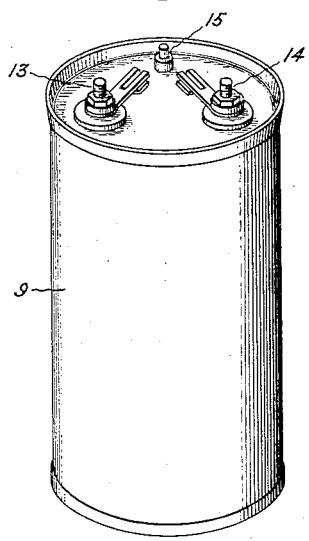
Figure 1:
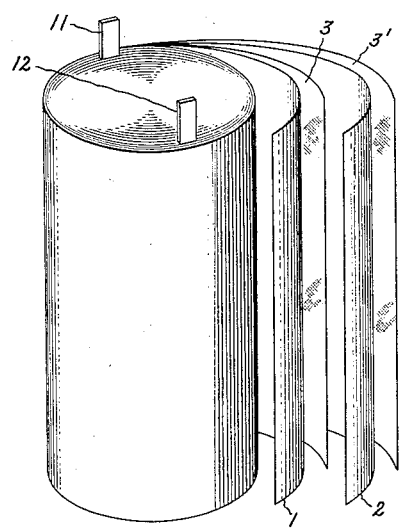
Figure 3:
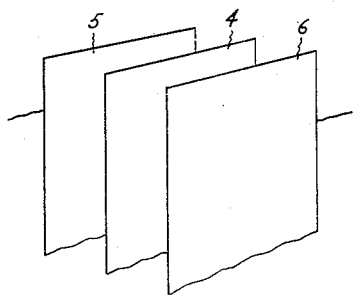
Figure 4:
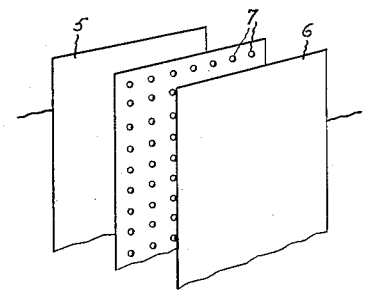

Our invention will be explained in connection with the accompanying drawing in which Fig. 1 illustrates in perspective a rolled type of capacitor (shown partly unrolled) in which our invention may be embodied; Fig. 2 is a perspective of a completed capacitor; and Figs. 3 and 4 are diagrammatic representations of modified constructions.

Referring to the drawing, the capacitor illustrated by Fig. 1 comprises armatures or electrodes 1, 2 of suitable metal, for example, aluminum, tantalum, or magnesium. The capacitor armatures ordinarily consist of aluminum foil having a thickness of about .001 to .003 inch. Between them is located a porous spacer 3 of imbibitory material, such, for example, as cheesecloth, porous paper or similar material. Its interstices are impregnated or filled during the fabrication of the capacitor. In the drawing two spacers 3, 3' have been shown, the capacitor of Fig. 1 being of the rolled type and it is of course desired that the spacer should be present in all cases between adjacent windings of the wound-up strip armatures.

The spacers 3, 3' preferably consist of fibrous cellulosic material, such as cheese cloth, for example. The spacer should be free from chlorides, and may have a thickness between the limits of about .0025 and .0055 inches, although this thickness is not critical. The thread count can be varied over a wide range. We have found cheesecloth having a thread count of 40 x 44 to be satisfactory. A paper spacer having a porosity similar to that of blotting paper may be used as shown at 4, Fig. 3. The thickness of the paper may be between .0004 and .001 inch. The thickness is not critical. In some cases it is preferable to use paper spacers as thin as .0003 inch. In such cases two sheets of paper are used. The spacer may be perforated, that is, provided with closely placed holes. It has been determined that paper containing 1 mm. diameter perforations spaced 1 to 2 mm. apart is satisfactory. A spacer is not an essential part of the present invention and may be omitted. Its use, however, is recommended.

Before the electrodes are assembled a film of oxide may, and preferably should, be produced thereon, preferably by electrolytic treatment in accordance with well understood practice. While the electrodes commonly consist of lengths of thin aluminum foil, plates 5, 6 as indicated in Fig. 3 may be used. The plates may be flat or corrugated. As indicated in Fig. 4 the spacer may be provided with holes or perforations 7.

A suitable electrolyte for the preliminary oxidation treatment may be made by dissolving 80 parts boric acid and 2 parts of borax by weight in 1000 parts of distilled water. The oxidation treatment may be carried out continuously or step-wise as well understood, and either with alternating or direct current. Ordinarily aluminum foil, when the oxidation treatment has been completed should not pass more than about one ampere per square foot at 160 volts direct current in an electrolytic bath which is at a temperature of about 95° C. For capacitors designed for alternating current application, two previously oxidized foils are used. For direct current application, one oxidized and one nonoxidized foil are used, the oxidized foil being the anode.

After the capacitors have been assembled in accordance with well understood practice as, for example, by rolling, as shown in Fig. 1, or by stacking, as shown in Fig. 3, the foils and the spacers being in proper relation, the assembly is immersed in a heated saturated aqueous solution of a suitable salt, for example ammonium borate, sodium borate, ammonium acetate, sodium acetate, Rochelle salt, sodium phosphate, sodium oxalate, and the like. It is desirable that whatever salt may be used shall be markedly more soluble in water at a high temperature than at a lower temperature.

The impregnation preferably should be carried out with a saturated solution at about 100° C. until the capacitor assembly is thoroughly saturated. Generally about 15 to 30 minutes' impregnation will accomplish this result.

After the capacitor has been impregnated, it is given a voltage treatment to oxidize any defective spots on the foil surface. These defective areas may be present as a result of the handling during the winding of the capacitor if of a rolled design, or during the stacking of the plates if of a flat stacked design.

The voltage applied should be equal to the operating voltage of the capacitor if alternating current is used. If direct current is used, the voltage should be equal to the peak value of the alternating current operating voltage for capacitors designed for alternating current service. When direct current voltages are used the polarity must be reversed at intervals. Twenty second intervals have been found satisfactory. With alternating current "curing" voltage, the voltage may be applied continuously or intermittently, depending upon the design of the capacitor and other construction features. For capacitors designed for 110 volt application, intermittently applied 110 volts have been found satisfactory, the voltage being applied for five to ten seconds with an equal rest period intervening between voltage applications. For direct current voltage application, the capacitor must be cured with direct current voltage, the oxidized foil being the anode. For either the direct current or alternating current voltage "curing" process, the voltage treatment is continued until stable capacity and loss characteristics are obtained. Usually a period of not more than one hour is sufficient. The assembly after impregnation and "curing" then should be rapidly cooled to room temperature. While, of course, this cooling may be carried out by cooling together the impregnated coil and the solution in which it is immersed, it is more convenient to remove the assembly from the solution and to transfer it to a saturated aqueous solution of the same salt which is at room temperature, or lower. The result of this cooling step is that the interstices in the porous spacer between the capacitor armatures becomes filled with a mass of fine salt crystals, the voids remaining in the spacer being filled with a saturated aqueous solution of the salt.

The capacitor assembly after impregnation and "curing" is assembled in its final case as shown at 9, Fig. 1. This may be of metal, preferably aluminum, or of fiber or pressed paper, preferably varnished or resin-treated. Before being sealed the assembly is drained to remove excess of water solution. Draining at temperatures not higher than 50° C. for 15 to 30 minutes is satisfactory. The assembly then is preferably sealed with wax, tar or other asphaltic sealing compound to prevent loss of water during operation of the capacitor at high temperature.

Electrical connection to the armatures is made by the strips 11, 12 to the external terminals 13, 14. A breather vent 15 may be applied if desired.

Capacitors which are prepared in accordance with the present invention are satisfactory for either direct current or for alternating current service. In alternating current service the capacitors are best suited for intermittent duty.

The electric capacity of capacitors prepared in accordance with this invention is higher than that of other commercial forms of electrolytic capacitors. For example, in 110 volt current service ordinarily electrolytic capacitors require about 8½ to 9 square inches of armature surface for one microfarad capacity whereas the herein described capacitors require only about 7 square inches of armature surface for the same capacity and for the same voltage. The power factor of capacitors embodying this invention is approximately 6% at 25° C.

What we claim as new and desire to secure by Letters Patent of the United States, is:

1. An electric device comprising the combination of cooperating armatures at least one of which is film-forming and being spaced closely adjacent one another, space between said armatures containing a concentrated aqueous solution of salt, said solution containing fine particles of salt in suspension.

2. An electric capacitor comprising the combination of aluminum armatures, a porous spacer between the same, fine particles of a water-soluble salt in the interstices of said spacer, and a saturated water solution of said salt filling voids in said spacer.

3. An electric condenser comprising the combination of aluminum armatures which have an oxidized surface, a porous spacer therebetween of fibrous cellulosic material, a water-soluble material of good dielectric property in the form of fine crystals in the interstices of said spacer and a solution filling the remaining voids of said spacer, the solvent vehicle of said solution consisting substantially wholly of water.

4. The steps in the fabrication of an electric capacitor consisting in impregnating said capacitor at an elevated temperature with a saturated aqueous solution of solid material having good dielectric property, applying voltage to said capacitor until stable operating characteristics are obtained, rapidly cooling to normal temperature, thereby causing precipitation of part of the dissolved material in a finely divided state and finally sealing said capacitor to prevent evaporation of impregnating solution.

FRANK M. CLARK.
RALPH A. RUSCETTA.